Patented Dec. 12, 1933

1,938,966

UNITED STATES PATENT OFFICE 1,938,966

CONDENSATION PRODUCTS OF CARBOHYDRATES WITH SULPHURIC ACID AND AROMATIC HYDROCARBONS

Alphons O. Jaeger, Mount Lebanon, Pa., assignor to The Selden Company, Pittsburgh, Pa., a corporation of Delaware No Drawing. Application January 31, 1931
Serial No. 512,753

18 Claims. (Cl. 260—2)

This invention relates to condensation products of carbohydrates and aromatic hydrocarbons with phthalic anhydride and sulphuric acid, which condensation products are excellent tanning agents.

It has been proposed to condense pure hydrocarbons such as naphthalene or benzene with cellulose and sulphuric acid to produce an artificial tanning agent.

According to the present invention I have found that tanning agents having superior properties can be prepared when condensation products of carbohydrates with phthalic anhydride are employed to combine with aromatic hydrocarbons in the presence of sulphuric acid. Pure phthalic anhydride may be used for this purpose, but it is an advantage of the invention that equivalent amounts of phthalic anhydride containing considerable impurities and even so impure as to be unsuitable for other purposes can be employed with equally good results, and the term "phthalic anhydride" is intended to include both the pure substance and an impure phthalic anhydride containing a wide range of impurities.

In preparing the products, carbohydrates and phthalic anhydride are reacted in the presence of concentrated sulphuric acid or oleum, the acid acting not only as a solvent for the carbohydrate but as a condensing agent to promote reaction with the phthalic anhydride. The resulting reaction product can then be combined with aromatic hydrocarbons of many kinds, either pure compounds such as naphthalene, anthracene, benzene, and the like being used or impure materials. In my prior patent Reissue No. 17,902 I have described the purification of crude aromatic compounds such as crude naphthalene, crude anthracene and the like by the use of solvents such as furfural, o-dichlorbenzene and similar materials. The residues from these purification processes consist of aromatic hydrocarbons, and in many cases of mixtures of different aromatic hydrocarbons, contaminated with all the impurities present in the original material. Such residues may be employed as a source of impure hydrocarbon material in the present invention.

A similar source of aromatic hydrocarbons may be found in the industrial residues obtained in the purification of crude aromatic hydrocarbons by selective sublimation or distillation such as, for example, those resulting from the fractional sublimation of naphthalene in the catalytic air oxidation of naphthalene to phthalic anhydride. As normally carried out, impure naphthalene of a brown color is vaporized by passing a current of warm air over the molten naphthalene in suitable vaporizers, the vapors then being catalytically oxidized to phthalic anhydride. After the volume of naphthalene in the vaporizer has dropped to a certain minimum, the residue is discharged as it no longer contains sufficient naphthalene to give satisfactory naphthalene-air vapors for the process. The residue is of a dark brown to black color and consists of a considerable proportion of naphthalene associated with large amounts of relatively non-volatile impurities, many of them of a tarry or pitchy nature.

A second residue of commercial importance from which excellent tanning agents can be obtained is that from the air-oxidation of crude or semi-purified anthracene to anthraquinone. As practiced in the United States, crude or semi-purified, for example 60 to 75%, anthracene is vaporized as described in connection with the naphthalene residue in the foregoing paragraph. The residue contains some anthracene, phenanthrene, carbazole and numerous tarry or pitchy impurities. It has a brownish color and is useless for any practical purpose, being normally thrown away although it can be used as a low grade fuel in some cases.

It will thus be seen that not only can superior tanning agents be prepared by the present invention, but that low grade and waste materials such as the product from phthalic anhydride converters, low grade material from the sublimation or distillation purification of phthalic anhydride, and the like may be employed, and as this may be reacted with by-products from the distillation or solvent purification of crude aromatic hydrocarbons valuable tanning agents are prepared almost entirely from materials that have heretofore been classed as industrial waste. In the claims the term "the residue from the purification of a crude aromatic hydrocarbon" is intended to refer to purification residues obtained by the above described processes, and it is understood that this terminology will have no other meaning.

The carbohydrates used in forming the condensation products of the present invention may also comprise waste material, and may include not only cellulose itself, such as, for example, cotton linters, chemical wood pulp, old paper, cotton rags, and the like, but soluble sugars or starch may also be used including waste products such as molasses, and it is also possible to use lignose cellulose such as wood flour, sawdust, ground wood pulp, old newspapers and the like.

The invention is not limited to the exclusive use either of pure or impure materials, but includes carbohydrates, phthalic anhydride and aromatic hydrocarbons in any form or grade of purity or impurity.

The invention will be described in greater detail in the following specific examples, which illustrate typical modifications. The parts are by weight.

Example 1

750 parts of 107.3% sulphuric acid are cooled to 20° C. and 34.3 parts pure phthalic anhydride, or the equivalent quantity of impure phthalic anhydride, are added. The mixture is further cooled to 16° C. and 50 parts of cellulose in the form of old sulphite paper, cotton linters or the like are added during four hours. The mixture is stirred during a further period of eight hours and is then a blackish liquid smelling somewhat of $SO_2$.

To this liquid are added 134 parts of residue from the purification of crude anthracene, the addition being made very slowly during a period of five hours and the temperature being kept at all times below 20° C. Stirring is continued until the reaction is complete, the resulting mass being a deep black, viscous liquid.

The above mixture is poured, with stirring, into 2,000 parts of water maintained as cold as possible, and milk of lime prepared from 360 parts of CaO is added after which neutralization is completed with $CaCO_3$. After filtering, the liquid may be evaporated to produce a solid product, or the calcium may be exchanged for sodium by treatment with sodium carbonate.

Example 2

1500 parts of 100% sulphuric acid are cooled to 20° C. and 70 parts pure phthalic anhydride are slowly added. After addition is complete, 100 parts cellulose in the form of waste paper or the like are added with stirring during two hours, and the mixture is further stirred with cooling for a period of three to six hours.

After the reaction is complete, 268 parts of a residue from the vaporization of semi-purified anthracene with air in the catalytic oxidation of anthracene to anthraquinone are added with constant stirring, the temperature being maintained below 25° C. and the stirring is continued until the reaction is completed. The product is then poured into a mixture of 4,000 parts ice and water and stirring continued for one hour, after which milk of lime made from 700 parts CaO is added, followed by sufficient calcium carbonate to complete neutralization. The product is filtered and converted into the sodium salt by treatment with sodium carbonate in the usual manner.

Example 3

50 parts cellulosic material in the form of waste paper are stirred into 750 parts 100% sulphuric acid maintained at 15–18° C. after which 70 parts phthalic anhydride are added and stirring is continued for ten to twenty hours until reaction is completed. 130–140 parts residue from the vaporization of impure naphthalene in the catalytic phthalic anhydride process are slowly added with stirring during five to eight hours and the mixture is maintained at 35° C. for fifty to seventy hours until reaction is completed.

The reaction product is slowly poured into a mixture of 1,000 parts ice and 1500 parts water and stirred for one-half hour, after which neutralization is effected with 300 parts CaO and further amounts of $CaCO_3$ in the usual manner. The product is stirred for one-half hour, filtered, washed, and the calcium replaced by sodium as in previous examples.

What is claimed as new is:

1. As a new chemical product, the condensation product of a carbohydrate, phthalic anhydride, an aromatic hydrocarbon, and sulphuric acid being dark viscous liquids of unknown chemical constitution but containing free sulphonic acid groups.

2. As a new chemical product, the condensation product of cellulose, phthalic anhydride, an aromatic hydrocarbon, and sulphuric acid being dark viscous liquids of unknown chemical constitution but containing free sulphonic acid groups.

3. As a new chemical product, the condensation product of a carbohydrate, phthalic anhydride, at least one polynuclear aromatic hydrocarbon, and sulphuric acid being dark viscous liquids of unknown chemical constitution but containing free sulphonic acid groups.

4. As a new chemical product, the condensation product of cellulose, phthalic anhydride, at least one polynuclear aromatic hydrocarbon, and sulphuric acid being dark viscous liquids of unknown chemical constitution but containing free sulphonic acid groups.

5. As a new chemical product, the condensation product of a carbonhydrate, phthalic anhydride, the residue from the purification of a crude aromatic hydrocarbon, and sulphuric acid being dark viscous liquids of unknown chemical constitution but containing free sulphonic acid groups.

6. As a new chemical product, the condensation product of a carbohydrate, phthalic anhydride, the residue from the purification of a crude aromatic hydrocarbon selected from the group consisting of naphthelene and anthracene, and sulphuric acid being dark viscous liquids of unknown chemical constitution but containing free sulphonic acid groups.

7. As a new chemical product, the condensation product of a carbohydrate, phthalic anhydride, the residue from a solvent purification of anthracene with a solvent for phenanthrene and carbazole, and sulphuric acid being dark viscous liquids of unknown chemical constitution but containing free sulphonic acid groups.

8. As a new chemical product, the condensation product of cellulose, phthalic anhydride, the residue from solvent purification of crude anthracene, and sulphuric acid being dark viscous liquids of unknown chemical constitution but containing free sulphonic acid groups.

9. As a new chemical product, the condensation product of a carbohydrate, phthalic anhydride, the residue from the vaporization purification of semi-purified anthracene, and sulphuric acid being dark viscous liquids of unknown chemical constitution but containing free sulphonic acid groups.

10. As a new chemictal product, the conrensation product of a carbohydrate, phthalic anhydride, the residue from the vaporization purification of crude naphthalene, and sulphuric acid being dark viscous liquids of unknown chemical constitution but containing free sulphonic acid groups.

11. As a new chemical product, the condensation product of a carbohydrate, crude phthalic anhydride, an aromatic hydrocarbon and sulphuric acid being dark viscous liquids of unknown chemical constitution but containing free sulphonic acid groups.

12. As a new chemical product, the condensation product of a carbohydrate, crude phthalic anhydride, the residue from the purification of at least one crude hydrocarbon selected from the group consisting of naphthalene and anthracene, and sulphuric acid being dark viscous liquids of unknown chemical constitution but containing free sulphonic acid groups.

13. The alkali metal salt of the condensation product of claim 1, being soluble in water and having the properties of a tanning agent.

14. The alkali metal salt of the condensation product of claim 2, being soluble in water and having the properties of a tanning agent.

15. The alkali metal salt of the condensation product of claim 3, being soluble in water and having the properties of a tanning agent.

16. The alkali metal salt of the condensation product of claim 4, being soluble in water and having the properties of a tanning agent.

17. The alkali metal salt of the condensation product of claim 5, being soluble in water and having the properties of a tanning agent.

18. The alkali metal salt of the condensation product of claim 11, being soluble in water and having the properties of a tanning agent.

ALPHONS O. JAEGER.